US 10,904,824 B2

(12) United States Patent
Robb et al.

(10) Patent No.: US 10,904,824 B2
(45) Date of Patent: Jan. 26, 2021

(54) VIRTUAL PRIVATE NETWORK

(71) Applicant: Intel Corporation, Santa Clara, CA (US)

(72) Inventors: Patricia Robb, Crystal Lake, IL (US); Naveen Aerrabotu, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/323,989

(22) PCT Filed: Sep. 1, 2017

(86) PCT No.: PCT/US2017/049843
§ 371 (c)(1),
(2) Date: Feb. 7, 2019

(87) PCT Pub. No.: WO2018/045281
PCT Pub. Date: Mar. 8, 2018

(65) Prior Publication Data
US 2019/0182755 A1    Jun. 13, 2019

Related U.S. Application Data

(60) Provisional application No. 62/383,042, filed on Sep. 2, 2016.

(51) Int. Cl.
*H04W 48/12* (2009.01)
*H04L 12/46* (2006.01)
(Continued)

(52) U.S. Cl.
CPC ......... *H04W 48/12* (2013.01); *H04L 12/4633* (2013.01); *H04L 12/4641* (2013.01);
(Continued)

(58) Field of Classification Search
CPC ..... H04W 48/12; H04W 48/18; H04W 48/20; H04W 12/0808; H04W 12/06;
(Continued)

(56) References Cited

U.S. PATENT DOCUMENTS

| 10,264,464 B1* | 4/2019 | Bartlett ................. H04W 16/14 |
| 2010/0017861 A1* | 1/2010 | Krishnaswamy ....... H04L 29/06 726/7 |

(Continued)

FOREIGN PATENT DOCUMENTS

| CN | 103959863 | 7/2014 |
| CN | 109565654 | 4/2019 |

(Continued)

OTHER PUBLICATIONS

"International Application Serial No. PCT/US2017/049843, International Search Report dated Nov. 15, 2017", 4 pgs.

(Continued)

*Primary Examiner* — Candal Elpenord
(74) *Attorney, Agent, or Firm* — Schwegman Lundberg & Woessner, P.A.

(57) ABSTRACT

System and techniques for a virtual private network are described herein. A plurality of host beacons may be obtained. Here, each beacon corresponds to a backhaul and includes an endpoint performance data structure. A set of endpoint performance data structures may be extracted from the plurality of host beacons. The set of endpoint performance data structures may be sorted based on a set of fields of members of the set of endpoint performance data structures. Entrance to a backhaul for a host corresponding to an endpoint performance data structure at an end of the sorted set of endpoint performance data structures may be negotiated.

24 Claims, 7 Drawing Sheets

(51) Int. Cl.

| | | |
|---|---|---|
| *H04W 48/18* | (2009.01) | |
| *H04W 48/20* | (2009.01) | |
| *H04W 12/06* | (2009.01) | |
| *H04W 12/08* | (2009.01) | |
| *H04L 29/06* | (2006.01) | |
| *H04W 4/24* | (2018.01) | |
| *H04M 15/00* | (2006.01) | |
| *H04L 12/917* | (2013.01) | |
| *H04L 12/927* | (2013.01) | |
| *H04L 12/911* | (2013.01) | |
| *H04W 84/18* | (2009.01) | |

(52) U.S. Cl.
CPC ........ *H04L 63/0272* (2013.01); *H04M 15/46* (2013.01); *H04M 15/805* (2013.01); *H04W 4/24* (2013.01); *H04W 12/06* (2013.01); *H04W 12/0808* (2019.01); *H04W 48/18* (2013.01); *H04W 48/20* (2013.01); *H04L 47/748* (2013.01); *H04L 47/76* (2013.01); *H04L 47/805* (2013.01); *H04W 84/18* (2013.01)

(58) Field of Classification Search
CPC .... H04W 4/24; H04W 84/18; H04L 12/4641; H04L 67/0272; H04L 12/4633; H04L 12/06; H04L 47/76; H04L 47/805; H04L 47/748; H04M 15/46; H04M 15/805
See application file for complete search history.

(56) References Cited

U.S. PATENT DOCUMENTS

| | | | |
|---|---|---|---|
| 2012/0166622 A1 | 6/2012 | Draznin et al. | |
| 2013/0322400 A1* | 12/2013 | Visuri | H04W 12/0608 370/331 |
| 2016/0262095 A1* | 9/2016 | Sakamoto | H04W 76/16 |
| 2016/0373935 A1* | 12/2016 | Smith | H04W 16/14 |
| 2017/0164212 A1* | 6/2017 | Opsenica | H04W 84/00 |

FOREIGN PATENT DOCUMENTS

| | | |
|---|---|---|
| EP | 2730147 | 5/2014 |
| EP | 2783535 A1 | 10/2014 |
| WO | WO-2018045281 A1 | 3/2018 |

OTHER PUBLICATIONS

"International Application Serial No. PCT/US2017/049843, Written Opinion dated Nov. 15, 2017", 15 pgs.

"European Application Serial No. 17768313.3, Response filed Jun. 8, 2020 to Communication Pursuant to Article 94(3) EPC dated Mar. 4, 2020", 16 pgs.

"International Application Serial No. PCT US2017 049843, International Preliminary Report on Patentability dated Mar. 14, 2019", 15 pgs.

"European Application Serial No. 17768313.3, Communication Pursuant to Article 94(3) EPC dated Mar. 4, 2020", 13 pgs.

"European Application Serial No. 17768313.3, Communication Pursuant to Article 94(3) EPC dated Sep. 15, 2020", 11 pgs.

"Chinese Application Serial No. 201780048763.5, Office Action dated Oct. 27, 2020", w English translation, 11 pgs.

* cited by examiner

VIRTUAL PRIVATE NETWORK

CLAIM OF PRIORITY

This patent application is a U.S. National Stage Application under 35 U.S.C. 371 from International Application No. PCT/US2017/049843, filed Sep. 1, 2017, published as WO 2018/045281, which claims the benefit of priority to U.S. Provisional Application Ser. No. 62/383,042, titled "VIRTUAL PRIVATE NETWORK" and filed on Sep. 2, 2016, the entireties of which are hereby incorporated by reference herein.

TECHNICAL FIELD

Embodiments described herein generally relate to computer networking and more specifically to a virtual private network.

BACKGROUND

Computer networking involves a wide range of technologies that permit communication from one device to another. These technologies not only include the connecting hardware, but also the protocols and formats that convert signals from the hardware into information that is usable by the machines. Hardware and software standards for networking have become important as the number of devices participating in networks has increased. Such standards may include any of the 3GPP families of cellular standards or the IEEE 802 families of standards, such as 802.11, 802.15.1, etc. Some of these standards provide intra network connections. For example a first connection may connect a device to a network component, such as a switch or a router, while a second connection links that network component to the destination device, or another network component. As used herein, that second connection is known as a backhaul, providing connectivity to the network endpoint that services the device.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
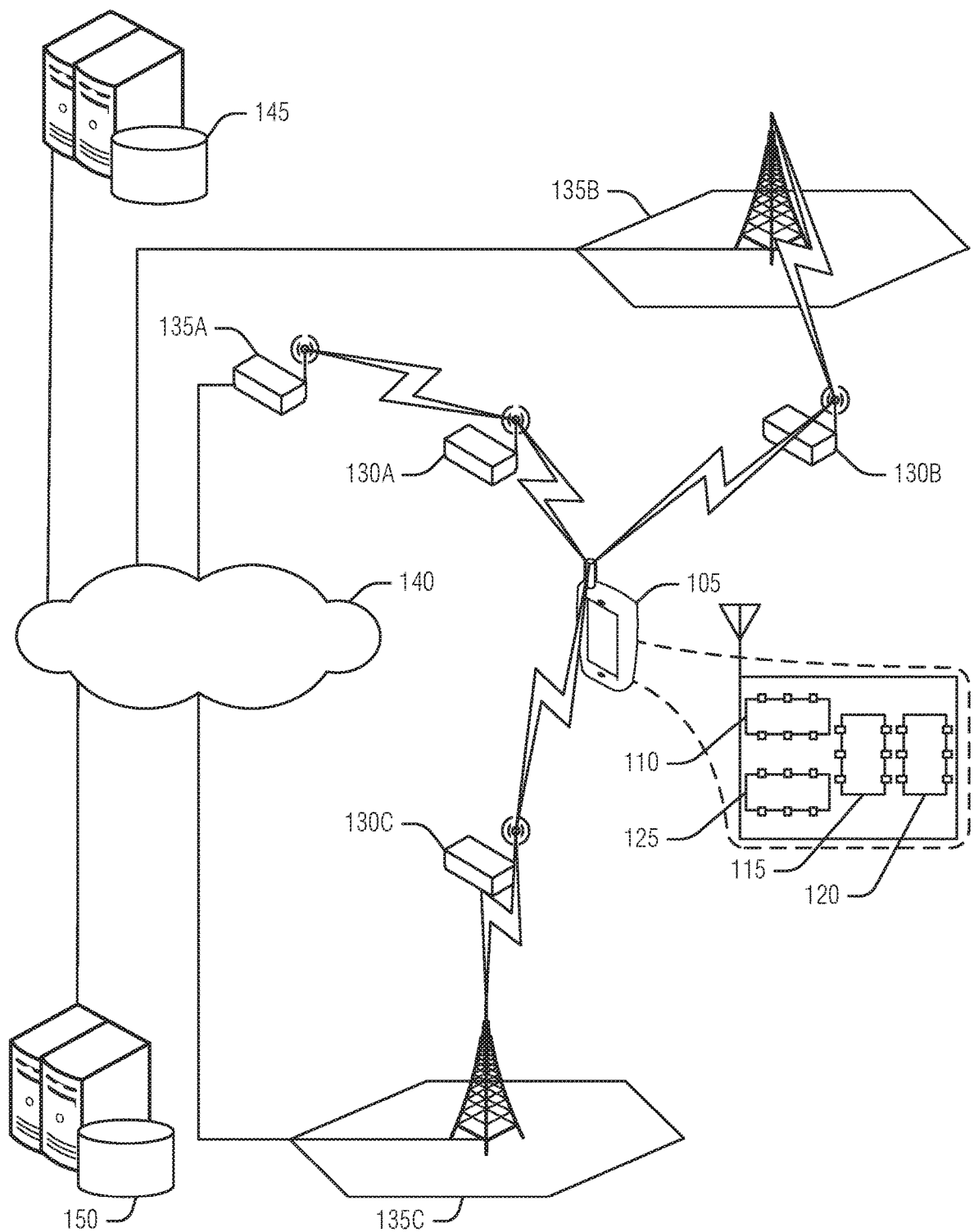
FIG. 1 is a block diagram of an example of a system for a virtual private network, according to an embodiment.

As radio resources become more constrained, localized network endpoints (such as femtocells or access points APs) may provide better radio utilization than centralized wireless technologies, such as are often found in cellular deployments. Many of these localized network endpoints are already owned and operated by private individuals or companies rather than a central telecommunications company. Although using these already installed endpoints reduces telecommunications costs, there are problems in gaining universal access via these endpoints as well as protecting those providing the endpoints.

To allow private endpoints to provide general connectivity access, these endpoint hosts may be extended to allow the private operator to be an access provider (e.g., a mobile virtual network operator (MVNO)). The extension may include extending beacons to include access parameters, including a market rate for the service or acceptance criteria. The attachment (e.g., connection, onboarding, etc.) of a device (e.g., a station (STA) or user equipment (UE)) may also be extended to facilitate negotiation between the host and the device in addition to the standard attachment information transfers (e.g., device identification, group identification, etc.). The negotiated attachment may include cost terms and remuneration procedures (e.g., a transaction of resources, money, etc.) as well as privacy or priority agreements. The host, after device attachment is successful, may implement a virtual private network between the device and a network destination over the host's backhaul. In this manner the device may negotiate with any endpoint host to gain a secure and private connection to a network resource (e.g., on the internet) while the host operator receives remuneration and protection against device activities.

By implementing the endpoint enhancements discussed herein, people will have the ability to operate a virtual network using other people's equipment, for example in a car, a home, an office, etc. The connectivity between the device and host, or of the backhaul may be over different radio access technologies, such as the IEEE 802.11, IEEE 802.15.1, or 3GPP families of standards or other network techniques (e.g., a wired connection). In an example, an association or group may be formed to negotiate air time from different hosts, pushing their assets (e.g., transmitted data) to different operators depending on what rate is negotiated. This technique permits efficient use of hosts in an area—for example, under-utilized hosts should be cheaper and thus garner more new transmission requests—while also providing an objective measure of over use and built in incentive to install more endpoint hosts (e.g., when costs become high one may be motivated to invest the capital to install another host). This would enable, for example, a private home owner, a car owner, or a business owner to resell part of their capacity if not in use. It would enable users to automatically select different operators based on spectrum capacity available and rates available and best rate available. For example, a group of cars may talk over IEEE 802.11 and one car (e.g., the host) to backhaul on a cellular radio to create a mesh between the cars, the traffic being aggregated and pushed over the cellular backhaul. The group of cars may for a group, with a second car also having a cellular backhaul. At a later point, the rate on the second backhaul may be cheaper, allowing the second car to offer a cheaper host rate. At this point, the remaining cars may drop the connection to the first car and use the backhaul of the second car. The attachment negotiation may also include capability resolution. For example, a first backhaul may be cheap but unreliable for large communications, such as video streaming. Thus, when a device receives a request to stream video, perform a large software update, or the like, the attachment negotiation will value reliability for throughput or reliability more than mere cost.

The systems and techniques described herein result in greater spectral efficiency, increase device access to networks, maintain operational isolation between host operators and device users, and also incentivize opening or installing network endpoint hosts for general access. The combination of these features presents a leap over the proprietary and isolated endpoint installations of the world today.

FIG. 1 is a block diagram of an example of a system 100 for a virtual private network, according to an embodiment. The system 100 includes a device 105 and hosts 130A-130C. The hosts 130 are connected to a backhaul 135, such as cellular backhauls 135B and 135C or mesh backhaul 135A. The host 130 and backhaul 135 provide access to a network 140, such as the internet.

The device 105 includes a component to implement the virtual private network described herein. All of the elements of the component are implemented in computer hardware, such as that described below with respect to FIG. 6 (e.g., circuitry). The component includes a receiver 110 arranged to obtain a plurality of host beacons. In an example, each beacon corresponds to a backhaul 135. Thus, if host 130C had a second backhaul as well as backhaul 135C, the host 130C may transmit two beacons, one for each backhaul. In an example, a single beacon includes a plurality of backhaul identifications. In an example, the beacon includes an endpoint performance data structure. The performance data structure may be unique to a backhaul 135. In an example, the performance data structure includes information about multiple backhauls 135, distinguishing them by at least one of an identification (ID) or performance metric.

The performance data structure provides metrics upon which a decision to join a given host 130 may be made. Thus, the performance data structure includes one or more fields to hold this data. In an example, the fields may include a type of connection. For example, a field indicates that the connection is an IEEE 802.11 5 gigahertz (GHz) connection between the device 105 and the host 130. In an example, wherein the type of connection includes at least one of a received signal strength or a protocol (e.g., IEEE 802.11 or IEEE 802.15.1). In an example, the connection indicates the backhaul 135 type, such as wireless (e.g., IEEE 802.xx, 3GPP, satellite, etc.) or hardwired (e.g., cable, Ethernet, frame relay, fiber optic, etc.). In an example, a fields indicates a bandwidth. In an example, a field indicate a latency. In an example, a field indicates a number of users using the backhaul (e.g., congestion, utilization of resources, etc.). In an example, a field indicates a cost of the backhaul. In an example, the cost is in a currency. In an example, the cost is in terms of resources (e.g., a ration of bandwidth offered versus used).

In an example, a field indicates a physical layer characteristic. The physical layer characteristics is at least one of a frequency, a channel width, or a multiple-input-multiple-output (MIMO) configuration. In an example, a field indicates a quality of service (QoS). As used herein, QoS is a metric indicating a promise to perform. For example, QoS may indicate a bandwidth or latency that is guaranteed by the underlying hardware. In an example, QoS is a priority offering, whereby higher priority traffic will displace lower priority traffic. Thus, while an absolute resource guarantee is not offered, the underlying hardware ensures that all available resources, including those dedicated to a lower priority transmission, will be made available to a higher priority transmission.

In an example, a field indicates application support. In an example, the application support is an indication of at least one of voice call support, music support, or video support. In an example, the application support is an indication of a virtual private network (VPN) support. This VPN support provides an encrypted tunnel between the device and a network endpoint, such as a workplace network. This is different that the partitioning that the host 130 may perform in order to isolate device 105 traffic from that of other devices or the host's operations generally.

The decoder 115 to extract a set of endpoint performance data structures from the plurality of host beacons. Hosts 130 are arranged to add the endpoint performance data structures to their beacons. Once these data structures have been decoded, the fields contained therein may be used for a variety of purposes, including determining which host 130 to attach.

The filter 120 is arranged to sort the set of endpoint performance data structures based on a set of fields of members of the set of endpoint performance data structures. This sorting is carried out based on user preferences. These preferences may prioritize performance over cost, for example, or emphasize cost savings when performance is not an issue, such as in reporting health data periodically. Generally, the sorting operates on a hierarchy of fields, first identifying hosts 130 with the highest bandwidth, for example. When several hosts 130 have the same bandwidth (e.g., within a margin of error of each other; the margin being configurable), then the next field is sorted, such as latency or cost. In this manner, all of the hosts 130 from which beacons were received are ordered. In an example, the ordering may discard hosts 130 at each level of sorting. In an example, fields are assigned a weight (e.g., a multiplier). The metrics present in the field is combined with the weight. As each field is weighted, a host score is created. The host scores may then be ordered to perform the sort. In an example, a combination of the field priority sorting and field weighting may include the weighting of groups of fields that are sequentially sorted.

In an example, to sort the set of endpoint performance data structures based on a set of fields of members of the set of endpoint performance data structures, the filter 120 sequentially sorts fields by a priority mapping. In an example, the priority mapping includes a ranking of the fields, the filter 120 sorting fields with a higher rank first. In an example, the priority mapping includes a threshold for at least one field, the threshold designating a range at which the field value will be considered. Thus, fields outside of the range are assigned a similar MAX or MIN value and will sort accordingly (e.g., two values above the threshold that are different will sort on that field as if they had the same MAX value). In an example, the range is defined as a single value and a direction. Here, the direction is at least one of greater than, greater than or equal to, less than, or less than or equal to.

The filter 120 governs the desirability of a given host 130 based on the fields in the endpoint performance data structures that have been received. Thus, for example, the sorting may eliminate hosts 130 that do not support voice data, or prioritize low cost hosts 130 over higher priced hosts 130. In this way, issues such as congestion (e.g., too many devices using a given host's backhaul 135) or costly backhaul 135 charges may be avoid by the device 105.

The transceiver 125 arranged to negotiate entrance to a backhaul 135 for a host corresponding to an endpoint performance data structure at an end of the sorted set of endpoint performance data structures. When the data structure is at the end of the sorted set, it is the best choice given the metrics available. The negotiation is the exchange between the device 105 and the selected host 130 to determine whether the device 105 will meet the host's expectations. In an example, the transceiver 125 uses the receiver 110 for reception purposes.

In an example, to negotiate entrance to the backhaul, the transceiver 125 is arranged to attach to the host. This attachment is a form of provisional network entry, such that regular network entry procedures are followed to establish the physical (PHY) or media access (MAC) communications according to the underlying connection protocol. It is provisional in that the device 105 is communicating only with the host 130 at this point, as access to the backhaul 135 is not yet granted.

After attachment, the transceiver 125 is arranged to cause an offer of a resource to be transmitted to the host 130. In an example, the resource is a physical resource of the device 105. This barter system may provide a reliable quid pro quo in collaborative device meshes. The purpose here may provide a reliable mechanism by which to gauge utilization and route around congestion more than to remunerate a host operator. In an example, the resource is a currency.

In an example, to negotiate entrance to the backhaul 135, a transaction in which the resource is exchanged for access to the backhaul 135 may be executed. In an example, the exchange occurs at a remote vendor machine 145 accessed by the device 105 via the host 130. In this example, the provisional connection between the device 105 and the host 130 is extended to permit a backhaul 135 connection to the remote vendor machine 145, such as one operated by a credit card company. Once the transaction is completed, a more general connection to the network 140 via the backhaul 135 is enabled by the host 130.

In an example, the offer provided by the device 105 is rejected by the host 130. The rejection may stem from the offer being insufficient to meet that indicated in the endpoint performance data structure for the host 130. In an example, the operating conditions of the host 130 may have changed between the beacon sending the endpoint performance data structure and the resource offer being made by the device 105. This may occur, for example, when another device's bandwidth use has increased, or if another device has attached to the host 130. In these example, the receiver 110 is arranged to obtain a rejection to the offer. The transceiver 125 then causes a counter offer of the resource to be transmitted to the host 130 in response to the rejection. The parameters of the counter offer may be configured by a user but are not implemented by the user. For example, the user may specify a maximum and minimum bid price for a particular level of bandwidth and latency. The transceiver 125 may have initially attempted the lower bound of that monetary range and been rejected. The transceiver 125 may then select a new offer based on a function, such as a logarithmic function, whereby initial changes to the offer are greater and diminish as offers continue. In an example, a negotiation clock limits the over time or number of offer and counter offer exchanges. This facilitates selection of a host 130 in a timely manner.

As noted above, security for the device 105 and the host 130 may be a concern in such as open access framework. To address this issue, in an example, the receiver 110 and the transceiver 125 negotiate entrance to the backhaul by exchanging security credentials with the host 130 for a backhaul session. In an example, the security credentials include public key certificates. In an example, to exchange security credentials, an interface with an authority 150 is established via the host 130. In an example, the security credentials include a usage token negotiated with the remote authority 150 prior to the negotiation. Here, the usage token is used by the host 130 to verify the device 105 with the remote authority 150. These security exchanges may benefit the host by verifying the device 105 in some way. Examples may include verifying that the device 105 is trusted (e.g., virus free, not associated with a rival company, etc.), or that the device has a subscription to the host 130 or a group to which the host 130 belongs.

Security between the device 105 and the host 130 may be further extended by isolating the device traffic from the host 130. This may alleviate, for example, host liability when the device 105 is used to engage in illegal or other undesirable activity. To establish this isolation, in an example, the transceiver 125 is arranged to establish a virtual network tunnel between the device 105 and a destination via the host 130 and backhaul 135 and transmit data to the destination via the virtual network tunnel. Such virtual networks inoculate the host 130 because the host 130 is unable to snoop on data passing via the tunnel. Thus, the benefit also inures to the device 105, preventing malicious host operators from stealing data.

The system described above may solve technical difficulties present when a user or device owner would like to re-sell or otherwise offer its WAN access to unknown devices. Examples may include: cable subscribers or cable providers (e.g., Guest or unique SSID) may be subleased to provide service; WAN service for non-cellular devices (e.g., tablets, music players, etc.) in a public environments (e.g., restaurants, bars, libraries, etc.); next generation cars offering WAN service for devices/users, among others.

Generally, the host 130 (e.g., WAN provider) broadcast connection information, such as: a Type of connection (e.g., 3G, 4G, 5G, etc.); data speed; count of users on the link; cost of service; whether VPN allowed (e.g., Y/N); current operating frequency (e.g., 2.4/5 GHz); MIMO characteristics of device; application support capabilities (e.g., voice call, music, video, etc.); a guaranteed QoS, among others. The client (e.g., device 105) prioritizes the visible networks based on of the above parameters and selects the service and subscribes through authorization or subscription. The host 130 allows packet routing after verifying subscription or authorization. The device 105 may establish a VPN or other secure connection over the unlicensed and licensed wireless paths.

As noted above, the device 105 implements a sorting and selection procedure for host selection. For example, the device may first, based on the received signals at the device 105, remove hosts 130 with bad or undesired signals. Second, the device 105 may prioritize the hosts 130 based on goal values for QoS, latency, bandwidth, or other characteristic. Once the host 130 is chosen, the device 105 may send a command to the host 130 to initiate the connection.

User experience for device operations may be a challenge in the sort of dynamic service providers enabled by this system. A usage token technique may reduce friction by allowing the device 105 to be preauthorized by the authority 150. This technique may include the following operations performed by the device 105 and host 130.

First, the device 105 may generate (e.g., acquire) a one-time use token and securely transmit it to the host 130. No wider network (e.g., internet) connectivity is used (or provided by the host 130) at this time.

Second, the host 130 provides limited connectivity to the device 105 to exchange certificates with the authority 150.

Third, the device 105 encrypts the token using the certificate and securely transmits the encrypted token to the host 130.

Fourth, the host 130 completes the transaction and enables the backhaul 135 for the device 105.

In this exchange, the host 130 is arranged to support multiple devices (e.g., subscribers) and may also move the devices between the states of "No Connectivity" and "Connected." In the use below, the device 105 performs a dynamic binding to acquire access to the network 140 via the host 130 and backhaul 135.

First, the device 105 bids on its viable set of hosts 130.

Second, the host 130 may respond positively or negatively to the bid or make an alternate offer.

Third, the device 105 may accept a bid and send REJECT PERMANENT to all other hosts 130 or stop responding after acceptance, leading to a timeout on other hosts 130.

Fourth, hosts 130 track metrics about bandwidth demands. The host 130 may trigger surge mode prior to or during the connection. The device 105 may be forced to accept surge conditions (e.g., rates) or move to an alternate network.

Figure 2:
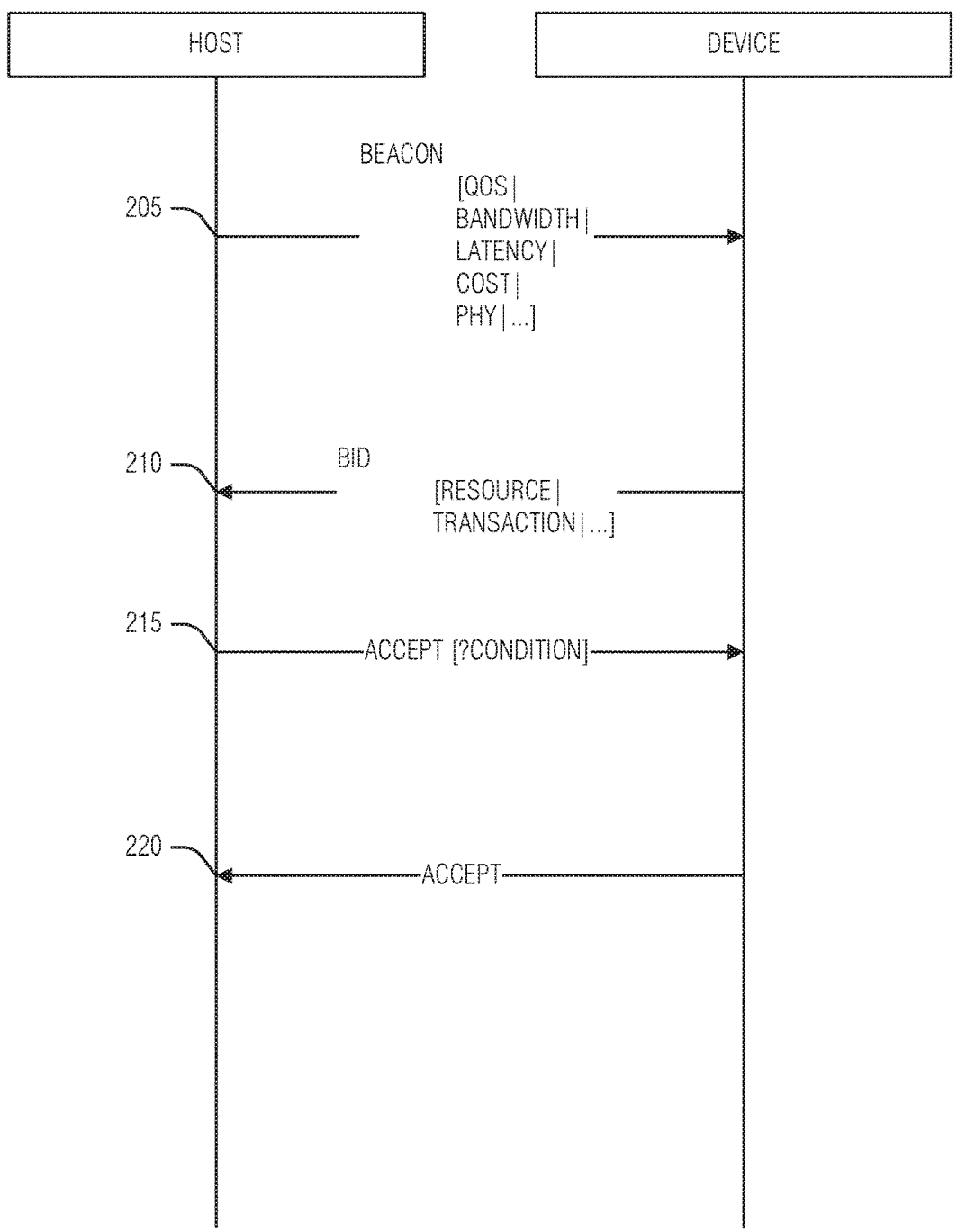
FIG. 2 illustrates an example of a communication to establish a virtual private network, according to an embodiment.

FIG. 2 illustrates an example of a communication 200 to establish a virtual private network, according to an embodiment. The communication 200 illustrates a network entry procedure whereby, for example, users of cellular service may provide wide area network (WAN) access to other users over non-cellular technologies, such as IEEE 802.11. IEEE 802.15.1, etc.

WAN access may be provided by advertising attributes of the backhaul to the WAN. In an example, the advertisement takes the form of a beacon. In an example, the advertisement is performed over unlicensed band technologies (e.g., IEEE 802.11, IEEE 802.15.1, etc.). In an example, the attributes include such metrics as application support, bandwidth, latency, and cost.

The host monitors its current ability to offer the backhaul service. This ability may be determined by backhaul pricing or use (e.g., bandwidth caps, time-of-day pricing or availability variations, etc.) and current use (e.g., by the primary user of the host or by other devices using the open endpoint). In an example, the variance in ability results in a variance in price. Thus, when availability is low, the price goes up. The host operator may configure a number of parameters around this determination, such as a function (exponential, linear, etc.), time parameters (e.g., higher evening and weekend pricing) among other things. The factors of the ability to host the open endpoint are packaged into an endpoint performance data structure and broadcast via a beacon (message 205).

When the device enters the beacon range for the host (e.g., when the device receives the beacon), the device decodes the beacon to determine what sort of endpoint the host is offering. In a modified attachment procedure from traditional wireless network entry, the device attaches with a bid (message 210). The bid is a data structure that includes the resource response and possibly a way to transact or otherwise record the transfer of the resource from the device operator to the host operator. As noted above, the bid may be below, or even above, that asked in the beacon.

In examples where there are more than one host available to the device, the bid may reflect such abundance. For example, the bid may be lower as a function of the number of suitable hosts. Further, the host to which the bid is made may be selected based on sorting capabilities of available hosts and contacting the host with the higher sort rank. Generally, devices prioritize the WAN backhaul offerings from hosts based on capabilities or cost.

After the host receives the bid, the host will determine whether to continue the attachment procedure. If the host decides not to continue, the attachment fails, the device left to seek another host. However, if the bid is accepted, the device is notified (message 215) along with further attachment instructions (e.g., security device to use, device ID, etc.). The device then completes the attachment with an acceptance (message 220). In an example, billing transactions for service are completed over peer-to-peer or cloud based transaction mechanisms. In an example, the host does not provide routing or bridging for the device to the backhaul until the transaction for services is complete.

Figure 3:
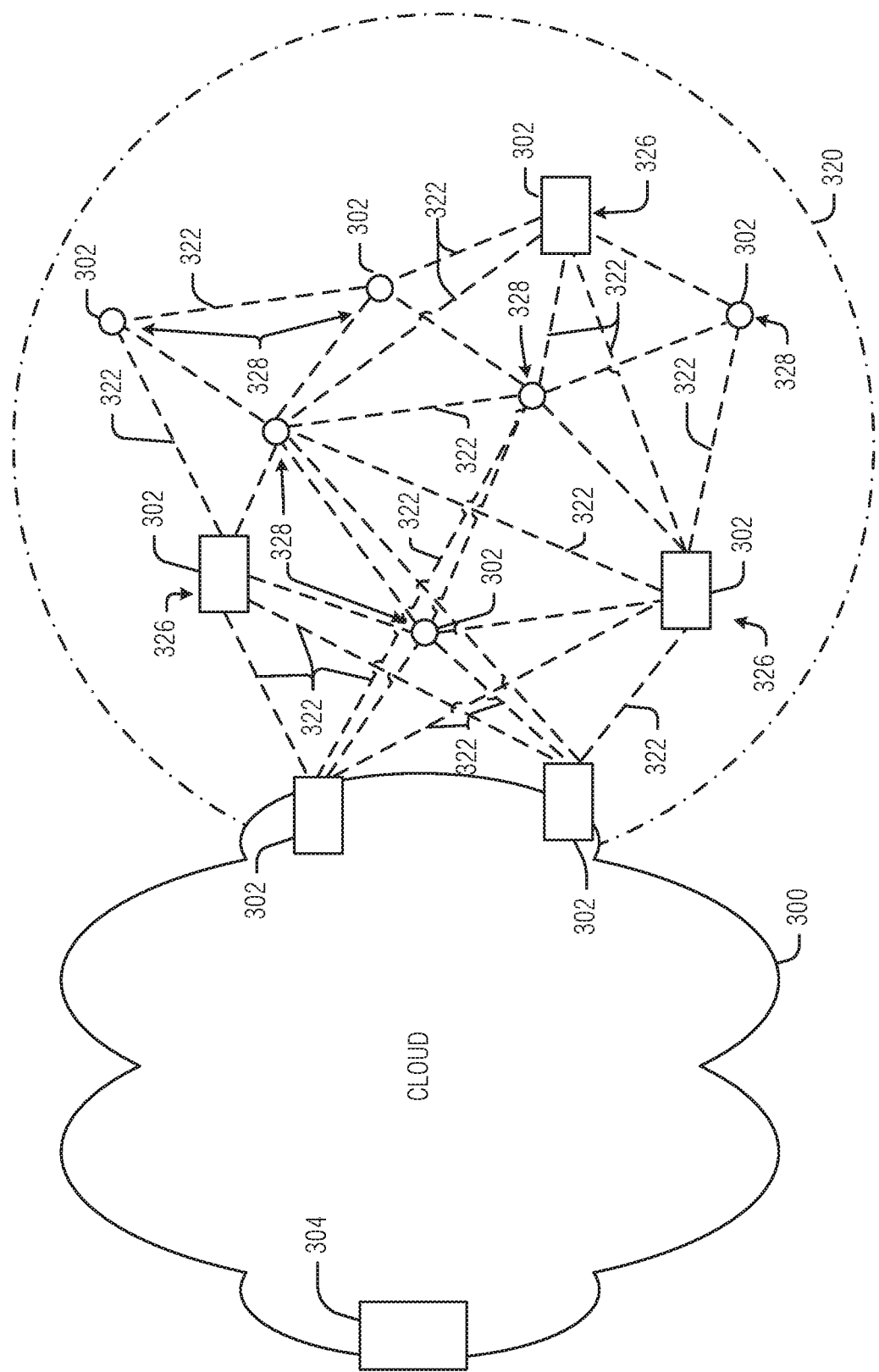
FIG. 3 illustrates an example of a cloud and Internet of Things (IoT) mesh network topology, according to an embodiment.

FIG. 3 is a drawing of a cloud computing network, or cloud 300, in communication with a mesh network of IoT devices 302, that may be termed a fog 320, operating at the edge of the cloud 300. To simplify the diagram, not every IoT device 302 is labeled.

The fog 320 may be considered to be a massively interconnected network wherein a number of IoT devices 302 are in communications with each other, for example, by radio links 322. This may be performed using the open interconnect consortium (OIC) standard specification 3.0 released by the Open Connectivity Foundation™ (OCF) on Dec. 23, 2015. This standard allows devices to discover each other and establish communications for interconnects. Other interconnection protocols may also be used, including, for example, the optimized link state routing (OLSR) Protocol, or the better approach to mobile ad-hoc networking (B.A.T-.M.A.N.), among others.

Three types of IoT devices 302 are shown in this example, gateways 324, data aggregators 326, and sensors 328, although any combinations of IoT devices 302 and functionality may be used. The gateways 324 may be edge devices that provide communications between the cloud 300 and the fog 320, and may also provide the backend process function for data obtained from sensors 328, such as motion data, flow data, temperature data, and the like. The data aggregators 326 may collect data from any number of the sensors 328, and perform the back end processing function for the analysis. The results, raw data, or both may be passed along to the cloud 300 through the gateways 324. The sensors 328 may be full IoT devices 302, for example, capable of both collecting data and processing the data. In some cases, the sensors 328 may be more limited in functionality, for example, collecting the data and allowing the data aggregators 326 or gateways 324 to process the data.

Communications from any IoT device 302 may be passed along the most convenient path between any of the IoT devices 302 to reach the gateways 324. In these networks, the number of interconnections provide substantial redundancy, allowing communications to be maintained, even with the loss of a number of IoT devices 302. Further, the use of a mesh network may allow IoT devices 302 that are very low power or located at a distance from infrastructure to be used, as the range to connect to another IoT device 302 may be much less than the range to connect to the gateways 324.

The fog 320 of these IoT devices 302 devices may be presented to devices in the cloud 300, such as a server 304, as a single device located at the edge of the cloud 300, e.g., a fog 320 device. In this example, the alerts coming from the fog 320 device may be sent without being identified as coming from a specific IoT device 302 within the fog 320.

In some examples, the IoT devices 302 may be configured using an imperative programming style, e.g., with each IoT device 302 having a specific function and communication partners. However, the IoT devices 302 forming the fog 320 device may be configured in a declarative programming style, allowing the IoT devices 302 to reconfigure their operations and communications, such as to determine needed resources in response to conditions, queries, and device failures. As an example, a query from a user located at a server 304 about the operations of a subset of equipment monitored by the IoT devices 302 may result in the fog 320 device selecting the IoT devices 302, such as particular sensors 328, needed to answer the query. The data from these sensors 328 may then be aggregated and analyzed by any combination of the sensors 328, data aggregators 326, or gateways 324, before being sent on by the fog 320 device to the server 304 to answer the query. In this example, IoT devices 302 in the fog 320 may select the sensors 328 used based on the query, such as adding data from flow sensors or temperature sensors. Further, if some of the IoT devices 302 are not operational, other IoT devices 302 in the fog 320 device may provide analogous data, if available.

Figure 4:
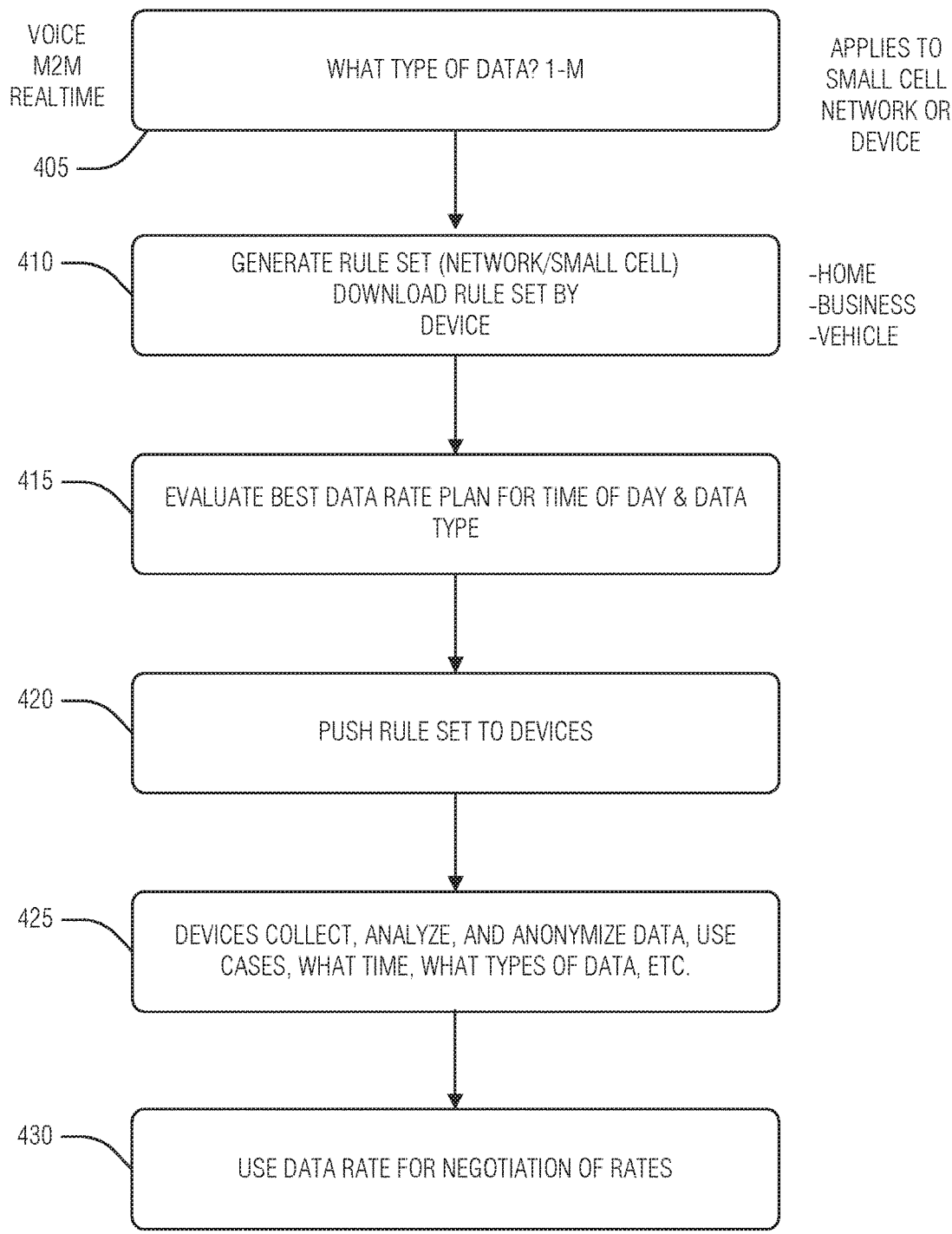
FIG. 4 illustrates an example of a method for implementing a virtual private network, according to an embodiment.

FIG. 4 illustrates an example of a method 400 for implementing a virtual private network, according to an embodiment. All operations of the method 400 are performed by computer hardware, such as that described above and below (e.g., circuitry).

At operation 405, a host receives a request for access from a device. The host evaluates the type of data being requested. Data types may include voice data, general data, video data, etc.

At operation 410, after the requested data type is known, the host creates a rule set. In an example, the rule set is embodied in the endpoint performance data structure. The rule set establishes the parameters by which the device may gain access to the host's backhaul. The ruleset is provided to the host, by an upstream provider (e.g., cellular or cable service).

At operation 415, the host evaluates the ruleset against others, if any, that are available to the host. In an example, the device evaluation focuses on evaluating the data rate plan embodied in the ruleset. This evaluation may vary based on the time of day, day of week, holiday, or location. This variance notes that expected services in certain time or location conditions will cost more or less, and the evaluation of available services may vary based on these conditions.

At operation 420, the parameters for entry are pushed to the devices. It is these parameters that constitute the host's side of the open access negotiation.

At operation 425, to facilitate negotiation with hosts, devices may collect metrics to determine use and available of alternative WAN access paths.

At operation 430, The use data visible to the devices from operation 425 is used to modify negotiation practice with the host. For example, if there is excess capacity, the device may provide a lower bid than otherwise.

Figure 5:
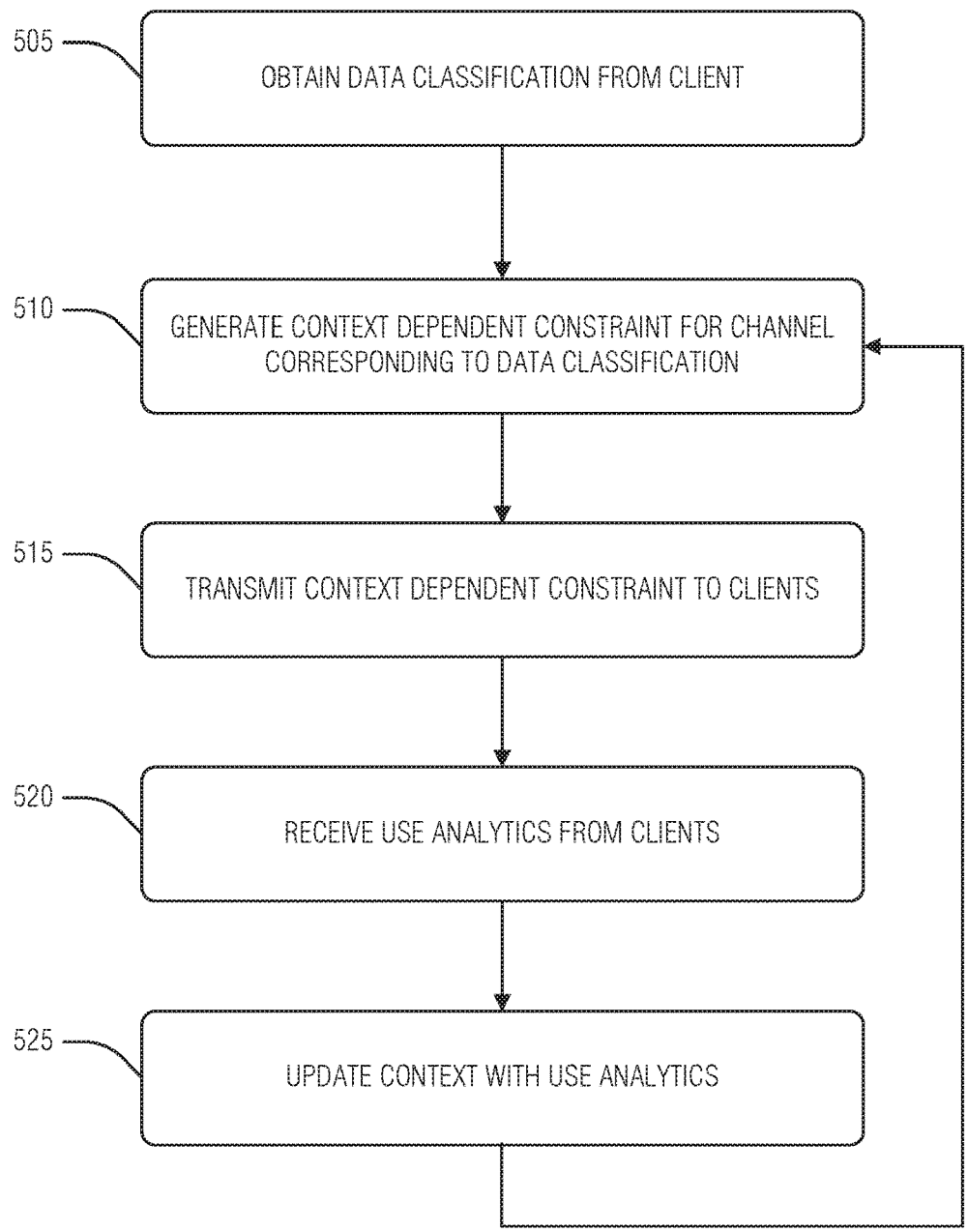
FIG. 5 illustrates an example of a method for a host implementing a virtual private network, according to an embodiment.

FIG. 5 illustrates an example of a method 500 for a host implementing a virtual private network, according to an embodiment. All operations of the method 500 are performed by computer hardware, such as that described above and below (e.g., circuitry).

At operation 505, the host receives a data classification from a device (e.g., client). The data classification may include one or more of a data type (e.g., video, chat, streaming, etc.), QoS designation, network destination, etc.

At operation 510, the host generates a context dependent constraint for a channel corresponding to the data classification. The channel, as used here, is a logical collection of resources that may be dedicated to a specific purpose, such as handling the device's data. The channel may be a particular backhaul, a portion of the backhaul (e.g., a subset of available bandwidth), a wireless resources (e.g., a particular frequency band or sub-band), or other subset of available resources.

The context dependent constraint is an observable and enforceable condition that the device must meet in order to gain access to the channel. An example of such a constraint is a security mechanism used by the device to securely communicate with the host. Another example may include an available resource that the device may trade for access to the channel, such as money. The constraint is context dependent because it may change based on the time, current resource utilization by the host, the data classification, or even the type or ownership of the device. Thus, during peak hours the rate to access the channel may be higher than in non-peak hours. Similarly, video streaming may be less expensive than general data access. This flexible constrain system permits the most efficient use of endpoint resources as in-demand resources will be more costly causing devices to seek out other providers and evening out the load.

At operation 515, The context dependent constraint is transmitted to the client devices. This transmission may be specific to the device originally providing the data classification. In an example, the transmission is provided to any client requesting access. In an example, the transmission is a broadcast, available to any client without regard to a pending access request. In an example, the transmission is in a beacon. Beacons are often used in wireless technologies, such as IEEE 802.11, to announce the host and provide attachment information, such as timing, available frequencies, etc. These beacon mechanism may be extended to include the constraints. By including the constraints in the beacon, at least one request response transmission cycle may be avoided, increasing spectral efficiency for useful work.

The devices may use the constraint to evaluate available hosts, selecting a host that has better constraint conditions over other hosts. This market for resources, as noted above, will lead to efficient radio and endpoint resource utilization. Once the desired host is found by the client, the client will attach to the host and negotiate access to a host backhaul. Once completed, the device will be able to access the network.

At operation 520, the host may request use analytics from clients periodically. These use analytics provide the host with client device demographics that allow the host to better estimate resource availability, resource limits, and other factors that influence context dependent constraint generation. The use analytics may be anonymized by the clients prior to transmission to protect client devices from divulging personal data of users while still informing the host.

At operation 525, the host updates its context with the received use analytics. The context may be an ongoing tally or estimation of a variety of metrics, such as a running average. In an example, the analytic contribution to the context is aged, such that older analytic metrics have a smaller impact on the context value than more current metrics. In this way, slow variations in client resource use over time are addressed without user intervention. Thus, a trend toward video streaming in a venue is noted by the context while a short-lived spike in instant messaging will not affect the context to any great degree, all without user intervention.

Figure 6:
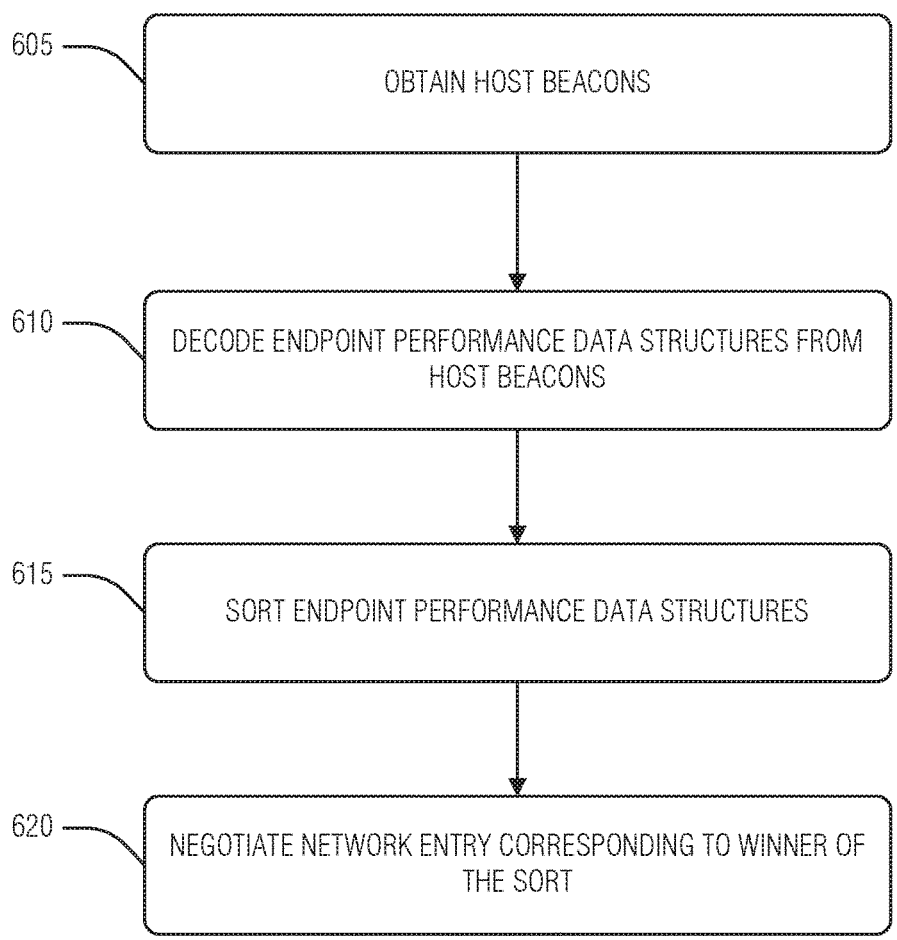
FIG. 6 illustrates an example of a method for a device implementing a virtual private network, according to an embodiment.

FIG. 6 illustrates an example of a method 600 for a device implementing a virtual private network, according to an embodiment. All operations of the method 400 are performed by computer hardware, such as that described above and below (e.g., circuitry).

At operation 605, a plurality of host beacons are obtained. Here, each beacon corresponds to a backhaul. Thus, a single host may have different beacons for each of a plurality of backhauls that the host provides. The beacons each also include an endpoint performance data structure.

At operation 610, a set of endpoint performance data structures are extracted (e.g., decoded) from the plurality of host beacons.

At operation 615, the set of endpoint performance data structures are sorted based on a set of fields of members of the set of endpoint performance data structures. In an example, the set of fields includes at least one of a type of connection, a bandwidth, a latency, a number of users using the backhaul, a cost of the backhaul, a physical layer characteristic, a QoS, or application support. In an example, the physical layer characteristics is at least one of a frequency, a channel width, or a multiple-input-multiple-output (MIMO) configuration. In an example, the type of connection includes at least one of a received signal strength or a protocol. In an example, the application support is an indication of at least one of voice call support, music support, video support, or virtual private network (VPN) support.

In an example, sorting the set of endpoint performance data structures based on a set of fields of members of the set of endpoint performance data structures includes sorting fields sequentially by a priority mapping. Here, the priority mapping includes a ranking of the fields. During the sort, fields with a higher rank are sorted first. In an example, the priority ranking includes a threshold for at least one field. The threshold designates a range at which the field value will be considered. In an example, the range is defined as a single value and a direction, wherein the direction is at least one of greater than, greater than or equal to, less than, or less than or equal to.

At operation 620, entrance to a backhaul for a host corresponding to an endpoint performance data structure at an end of the sorted set of endpoint performance data structures is negotiated. In an example, the negotiation includes attaching to the host, and causing an offer of a resource to be transmitted to the host. In an example, the method 600 is extended to also include obtaining a rejection to the offer, and causing a counter offer of the resource to be transmitted to the host in response to the rejection. In an example, the resource is a currency. In an example, the resource is a physical resource of the device. In an example, negotiating entrance to the backhaul includes executing a transaction in which the resource is exchanged for access to the backhaul. In an example, the exchange occurs at a remote vendor machine accessed via the host.

In an example, negotiating entrance to the backhaul includes exchanging security credentials with the host for a backhaul session. In an example, the security credentials include public key certificates. In an example, exchanging the security credentials includes interfacing with an authority via the host. In an example, the security credentials include a usage token negotiated with a remote authority prior to the negotiation. This usage token is then used by the host to verify the device with the remote authority.

The method 600 may optionally be extended to include establishing a virtual network tunnel between the device and a destination via the host and backhaul. After this tunnel is established, the method 600 includes transmitting data to the destination via the virtual network tunnel.

Figure 7:
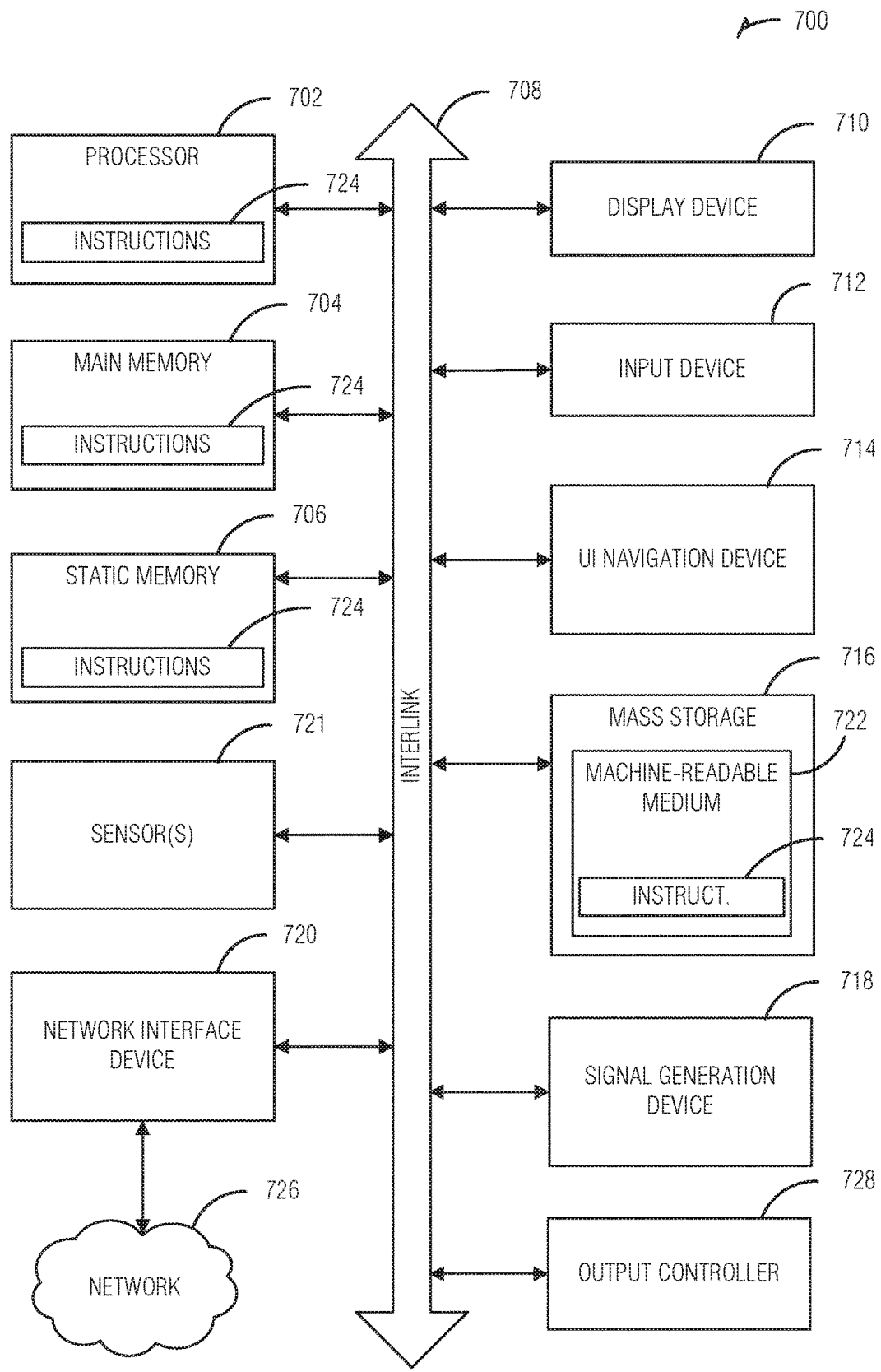
FIG. 7 is a block diagram illustrating an example of a machine upon which one or more embodiments may be implemented.

FIG. 7 illustrates a block diagram of an example machine 700 upon which any one or more of the techniques (e.g., methodologies) discussed herein may perform. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 716 may constitute machine readable media.

While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMAX®), IEEE 802.15.4 family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software.

ADDITIONAL NOTES & EXAMPLES

Example 1 is a component of a device for a virtual private network, the component comprising: a receiver to obtain a plurality of host beacons, each beacon corresponding to a backhaul and including an endpoint performance data structure; a decoder to extract a set of endpoint performance data structures from the plurality of host beacons; and a filter to sort the set of endpoint performance data structures based on a set of fields of members of the set of endpoint performance data structures.

In Example 2, the subject matter of Example 1 includes, a transceiver to negotiate entrance to a backhaul for a host corresponding to an endpoint performance data structure at an end of the sorted set of endpoint performance data structures.

In Example 3, the subject matter of Example 2 includes, wherein to negotiate entrance to the backhaul includes the transceiver to: attach to the host; and cause an offer of a resource to be transmitted to the host.

In Example 4, the subject matter of Example 3 includes, wherein the receiver is to obtain a rejection to the offer, and wherein the transceiver is to cause a counter offer of the resource to be transmitted to the host in response to the rejection.

In Example 5, the subject matter of Examples 3-4 includes, wherein the resource is a currency.

In Example 6, the subject matter of Example 5 includes, wherein to negotiate entrance to the backhaul includes executing a transaction in which the resource is exchanged for access to the backhaul.

In Example 7, the subject matter of Example 6 includes, wherein the exchange occurs at a remote vendor machine accessed by the device via the host.

In Example 8, the subject matter of Examples 3-7 includes, wherein the resource is a physical resource of the device.

In Example 9, the subject matter of Examples 2-8 includes, wherein to negotiate entrance to the backhaul includes the receiver and the transceiver to exchange security credentials with the host for a backhaul session.

In Example 10, the subject matter of Example 9 includes, wherein the security credentials include public key certificates.

In Example 11, the subject matter of Examples 9-10 includes, wherein to exchange security credentials includes interfacing with an authority via the host.

In Example 12, the subject matter of Examples 9-11 includes, wherein the security credentials include a usage token negotiated with a remote authority prior to the negotiation, the usage token being used by the host to verify the device with the remote authority.

In Example 13, the subject matter of Examples 1-12 includes, wherein the set of fields includes at least one of a type of connection, a bandwidth, a latency, a number of users using the backhaul, a cost of the backhaul, a physical layer characteristic, a quality of service (QoS), or application support.

In Example 14, the subject matter of Example 13 includes, wherein the physical layer characteristics is at least one of a frequency, a channel width, or a multiple-input-multiple-output (MIMO) configuration.

In Example 15, the subject matter of Examples 13-14 includes, wherein the type of connection includes at least one of a received signal strength or a protocol.

In Example 16, the subject matter of Examples 13-15 includes, wherein the application support is an indication of at least one of voice call support, music support, video support, or virtual private network (VPN) support.

In Example 17, the subject matter of Examples 2-16 includes, wherein the transceiver is also to: establish a virtual network tunnel between the device and a destination via the host and backhaul; and transmit data to the destination via the virtual network tunnel.

In Example 18, the subject matter of Examples 1-17 includes, wherein to sort the set of endpoint performance data structures based on a set of fields of members of the set of endpoint performance data structures includes the filter to sequentially sort fields by a priority mapping, the priority mapping including a ranking of the fields, fields with a higher rank being sorted first.

In Example 19, the subject matter of Example 18 includes, wherein the priority ranking includes a threshold for at least one field, the threshold designating a range at which the field value will be considered.

In Example 20, the subject matter of Example 19 includes, wherein the range is defined as a single value and a direction, wherein the direction is at least one of greater than, greater than or equal to, less than, or less than or equal to.

Example 21 is a component of a host for a virtual private network, the component comprising: a first transceiver to: transmit a beacon including an endpoint performance data structure; receive a preliminary attachment from a device including a response to a condition field in the endpoint performance data structure; receiving a conclusion message from the device; and accepting data from the device after receiving the conclusion message; a second transceiver to communicate the data from the device via a backhaul; and a counter to: compare the response to a value in the condition field; approve connection for the device in response to the value in the condition field, the approval initiating the conclusion message; and change the condition field in response to backhaul activity.

In Example 22, the subject matter of Example 21 includes, wherein the beacon includes a legacy data set and an extension, and wherein the endpoint performance data structure is the extension.

Example 23 is a method of a device for a virtual private network, the method comprising: obtaining a plurality of host beacons, each beacon corresponding to a backhaul and including an endpoint performance data structure; extracting a set of endpoint performance data structures from the plurality of host beacons; sorting the set of endpoint performance data structures based on a set of fields of members of the set of endpoint performance data structures; and negotiating entrance to a backhaul for a host corresponding to an endpoint performance data structure at an end of the sorted set of endpoint performance data structures.

In Example 24, the subject matter of Example 23 includes, wherein negotiating entrance to the backhaul includes: attaching to the host; and causing an offer of a resource to be transmitted to the host.

In Example 25, the subject matter of Example 24 includes, obtaining a rejection to the offer; and causing a counter offer of the resource to be transmitted to the host in response to the rejection.

In Example 26, the subject matter of Examples 24-25 includes, wherein the resource is a currency.

In Example 27, the subject matter of Example 26 includes, wherein negotiating entrance to the backhaul includes executing a transaction in which the resource is exchanged for access to the backhaul.

In Example 28, the subject matter of Example 27 includes, wherein the exchange occurs at a remote vendor machine accessed via the host.

In Example 29, the subject matter of Examples 24-28 includes, wherein the resource is a physical resource of the device.

In Example 30, the subject matter of Examples 23-29 includes, wherein negotiating entrance to the backhaul includes exchanging security credentials with the host for a backhaul session.

In Example 31, the subject matter of Example 30 includes, wherein the security credentials include public key certificates.

In Example 32, the subject matter of Examples 30-31 includes, wherein exchanging the security credentials includes interfacing with an authority via the host.

In Example 33, the subject matter of Examples 30-32 includes, wherein the security credentials include a usage token negotiated with a remote authority prior to the negotiation, the usage token being used by the host to verify the device with the remote authority.

In Example 34, the subject matter of Examples 23-33 includes, wherein the set of fields includes at least one of a type of connection, a bandwidth, a latency, a number of users using the backhaul, a cost of the backhaul, a physical layer characteristic, a quality of service (QoS), or application support.

In Example 35, the subject matter of Example 34 includes, wherein the physical layer characteristics is at least one of a frequency, a channel width, or a multiple-input-multiple-output (MIMO) configuration.

In Example 36, the subject matter of Examples 34-35 includes, wherein the type of connection includes at least one of a received signal strength or a protocol.

In Example 37, the subject matter of Examples 34-36 includes, wherein the application support is an indication of at least one of voice call support, music support, video support, or virtual private network (VPN) support.

In Example 38, the subject matter of Examples 23-37 includes, establishing a virtual network tunnel between the device and a destination via the host and backhaul; and transmitting data to the destination via the virtual network tunnel.

In Example 39, the subject matter of Examples 23-38 includes, wherein sorting the set of endpoint performance data structures based on a set of fields of members of the set of endpoint performance data structures includes sorting fields sequentially by a priority mapping, the priority mapping including a ranking of the fields, fields with a higher rank being sorted first.

In Example 40, the subject matter of Example 39 includes, wherein the priority ranking includes a threshold for at least one field, the threshold designating a range at which the field value will be considered.

In Example 41, the subject matter of Example 40 includes, wherein the range is defined as a single value and a direction, wherein the direction is at least one of greater than, greater than or equal to, less than, or less than or equal to.

Example 42 is at least one machine readable medium including instructions that, when executed by processing circuitry, cause the processing circuitry to perform any method of Examples 23-41.

Example 43 is a system comprising means to perform any method of Examples 23-41.

Example 44 is a system of a device for a virtual private network, the system comprising: means for obtaining a plurality of host beacons, each beacon corresponding to a backhaul and including an endpoint performance data structure; means for extracting a set of endpoint performance data structures from the plurality of host beacons; means for sorting the set of endpoint performance data structures based on a set of fields of members of the set of endpoint performance data structures; and means for negotiating entrance to a backhaul for a host corresponding to an endpoint performance data structure at an end of the sorted set of endpoint performance data structures.

In Example 45, the subject matter of Example 44 includes, wherein the means for negotiating entrance to the backhaul include: means for attaching to the host; and means for causing an offer of a resource to be transmitted to the host.

In Example 46, the subject matter of Example 45 includes, means for obtaining a rejection to the offer; and means for causing a counter offer of the resource to be transmitted to the host in response to the rejection.

In Example 47, the subject matter of Examples 45-46 includes, wherein the resource is a currency.

In Example 48, the subject matter of Example 47 includes, wherein the means for negotiating entrance to the backhaul include means for executing a transaction in which the resource is exchanged for access to the backhaul.

In Example 49, the subject matter of Example 48 includes, wherein the exchange occurs at a remote vendor machine accessed via the host.

In Example 50, the subject matter of Examples 45-49 includes, wherein the resource is a physical resource of the device.

In Example 51, the subject matter of Examples 44-50 includes, wherein the means for negotiating entrance to the backhaul include means for exchanging security credentials with the host for a backhaul session.

In Example 52, the subject matter of Example 51 includes, wherein the security credentials include public key certificates.

In Example 53, the subject matter of Examples 51-52 includes, wherein the means for exchanging the security credentials include interfacing with an authority via the host.

In Example 54, the subject matter of Examples 51-53 includes, wherein the security credentials include a usage token negotiated with a remote authority prior to the negotiation, the usage token being used by the host to verify the device with the remote authority.

In Example 55, the subject matter of Examples 44-54 includes, wherein the set of fields includes at least one of a type of connection, a bandwidth, a latency, a number of users using the backhaul, a cost of the backhaul, a physical layer characteristic, a quality of service (QoS), or application support.

In Example 56, the subject matter of Example 55 includes, wherein the physical layer characteristics is at least one of a frequency, a channel width, or a multiple-input-multiple-output (MIMO) configuration.

In Example 57, the subject matter of Examples 55-56 includes, wherein the type of connection includes at least one of a received signal strength or a protocol.

In Example 58, the subject matter of Examples 55-57 includes, wherein the application support is an indication of at least one of voice call support, music support, video support, or virtual private network (VPN) support.

In Example 59, the subject matter of Examples 44-58 includes, means for establishing a virtual network tunnel between the device and a destination via the host and backhaul; and means for transmitting data to the destination via the virtual network tunnel.

In Example 60, the subject matter of Examples 44-59 includes, wherein the means for sorting the set of endpoint performance data structures based on a set of fields of members of the set of endpoint performance data structures include sorting fields sequentially by a priority mapping, the priority mapping including a ranking of the fields, fields with a higher rank being sorted first.

In Example 61, the subject matter of Example 60 includes, wherein the priority ranking includes a threshold for at least one field, the threshold designating a range at which the field value will be considered.

In Example 62, the subject matter of Example 61 includes, wherein the range is defined as a single value and a direction, wherein the direction is at least one of greater than, greater than or equal to, less than, or less than or equal to.

Example 63 is at least one machine readable medium including instructions for a virtual private network, the instructions, when executed by a machine, cause the machine to perform operations comprising: obtaining a plurality of host beacons, each beacon corresponding to a backhaul and including an endpoint performance data structure; extracting a set of endpoint performance data structures from the plurality of host beacons; sorting the set of endpoint performance data structures based on a set of fields of members of the set of endpoint performance data structures; and negotiating entrance to a backhaul for a host corresponding to an endpoint performance data structure at an end of the sorted set of endpoint performance data structures.

In Example 64, the subject matter of Example 63 includes, wherein negotiating entrance to the backhaul includes: attaching to the host; and causing an offer of a resource to be transmitted to the host.

In Example 65, the subject matter of Example 64 includes, wherein the operations further comprise: obtaining a rejection to the offer; and causing a counter offer of the resource to be transmitted to the host in response to the rejection.

In Example 66, the subject matter of Examples 64-65 includes, wherein the resource is a currency.

In Example 67, the subject matter of Example 66 includes, wherein negotiating entrance to the backhaul includes executing a transaction in which the resource is exchanged for access to the backhaul.

In Example 68, the subject matter of Example 67 includes, wherein the exchange occurs at a remote vendor machine accessed via the host.

In Example 69, the subject matter of Examples 64-68 includes, wherein the resource is a physical resource of the device.

In Example 70, the subject matter of Examples 63-69 includes, wherein negotiating entrance to the backhaul includes exchanging security credentials with the host for a backhaul session.

In Example 71, the subject matter of Example 70 includes, wherein the security credentials include public key certificates.

In Example 72, the subject matter of Examples 70-71 includes, wherein exchanging the security credentials includes interfacing with an authority via the host.

In Example 73, the subject matter of Examples 70-72 includes, wherein the security credentials include a usage token negotiated with a remote authority prior to the negotiation, the usage token being used by the host to verify the device with the remote authority.

In Example 74, the subject matter of Examples 63-73 includes, wherein the set of fields includes at least one of a type of connection, a bandwidth, a latency, a number of users using the backhaul, a cost of the backhaul, a physical layer characteristic, a quality of service (QoS), or application support.

In Example 75, the subject matter of Example 74 includes, wherein the physical layer characteristics is at least one of a frequency, a channel width, or a multiple-input-multiple-output (MIMO) configuration.

In Example 76, the subject matter of Examples 74-75 includes, wherein the type of connection includes at least one of a received signal strength or a protocol.

In Example 77, the subject matter of Examples 74-76 includes, wherein the application support is an indication of at least one of voice call support, music support, video support, or virtual private network (VPN) support.

In Example 78, the subject matter of Examples 63-77 includes, wherein the operations further comprise: establishing a virtual network tunnel between the device and a destination via the host and backhaul; and transmitting data to the destination via the virtual network tunnel.

In Example 79, the subject matter of Examples 63-78 includes, wherein sorting the set of endpoint performance data structures based on a set of fields of members of the set of endpoint performance data structures includes sorting fields sequentially by a priority mapping, the priority mapping including a ranking of the fields, fields with a higher rank being sorted first.

In Example 80, the subject matter of Example 79 includes, wherein the priority ranking includes a threshold for at least one field, the threshold designating a range at which the field value will be considered.

In Example 81, the subject matter of Example 80 includes, wherein the range is defined as a single value and a direction, wherein the direction is at least one of greater than, greater than or equal to, less than, or less than or equal to.

Example 82 is at least one machine-readable medium including instructions that, when executed by processing circuitry, cause the processing circuitry to perform operations to implement of any of Examples 1-81.

Example 83 is an apparatus comprising means to implement of any of Examples 1-81.

Example 84 is a system to implement of any of Examples 1-81.

Example 85 is a method to implement of any of Examples 1-81.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A component of a device for a virtual private network, the component comprising:
 a receiver to obtain a plurality of host beacons, each host beacon corresponding to a backhaul and including an endpoint performance data structure, the endpoint performance data structure including metrics of the backhaul in a set of fields, the set of fields including at least two of:
 a bandwidth;

a latency;
a number of users using the backhaul;
a cost of the backhaul;
a physical layer characteristic;
a quality of service (QoS); or
application support;
a decoder to extract a set of endpoint performance data structures from the plurality of host beacons;
a filter to sort the set of endpoint performance data structures based on sets of fields of members of the set of endpoint performance data structures; and
a transceiver to negotiate entrance to one backhaul for a host corresponding to an endpoint performance data structure at an end of the sorted set of endpoint performance data structures.

2. The component of claim 1, wherein to negotiate entrance to the backhaul includes the transceiver to:
attach to the host; and
cause an offer of a resource to be transmitted to the host.

3. The component of claim 2, wherein the receiver is to obtain a rejection to the offer, and wherein the transceiver is to cause a counteroffer of the resource to be transmitted to the host in response to the rejection.

4. The component of claim 1, wherein to negotiate entrance to the backhaul includes the receiver and the transceiver to exchange security credentials with the host for a backhaul session.

5. The component of claim 4, wherein to exchange security credentials includes interfacing with an authority via the host.

6. The component of claim 1, wherein the physical layer characteristics is at least one of a frequency, a channel width, or a multiple-input-multiple-output (MIMO) configuration.

7. The component of claim 1, wherein the type of connection includes at least one of a received signal strength or a protocol.

8. The component of claim 1, wherein the application support is an indication of at least one of voice call support, music support, video support, or virtual private network (VPN) support.

9. The component of claim 1, wherein the transceiver is also to:
establish a virtual network tunnel between the device and a destination via the host and backhaul; and
transmit data to the destination via the virtual network tunnel.

10. The component of claim 1, wherein to sort the set of endpoint performance data structures based on a set of fields of members of the set of endpoint performance data structures includes the filter to sequentially sort fields by a priority mapping, the priority mapping including a ranking of the fields, fields with a higher rank being sorted first.

11. The component of claim 1, wherein two host beacons of the plurality of host beacons originate from a single host and correspond to two different backhauls of the single host.

12. A component of a host for a virtual private network, the component comprising:
a first transceiver to:
transmit a beacon including an endpoint performance data structure, the endpoint performance data structure including metrics of a backhaul in a set of condition fields, the set of condition fields including at least two of:
a bandwidth;
a latency;
a number of users using the backhaul;
a cost of the backhaul;
a physical layer characteristic;
a quality of service (QoS); or
application support;
receive a preliminary attachment from a device including a response to a condition field in the endpoint performance data structure;
receiving a conclusion message from the device; and
accepting data from the device after receiving the conclusion message;
a second transceiver to communicate the data from the device via the backhaul; and
a counter to:
compare the response to a value in the condition field;
approve connection for the device in response to the value in the condition field, the approval initiating the conclusion message; and
change the condition field in response to backhaul activity.

13. The component of claim 2, wherein the beacon includes a legacy data set and an extension, and wherein the endpoint performance data structure is the extension.

14. The component of claim 2, wherein the first transceiver is configured to transmit a second beacon for a second backhaul, the second beacon including a second endpoint data structure including metrics of the second backhaul.

15. At least one machine non-transitory readable medium including instructions for a virtual private network, the instructions, when executed by a machine, cause the machine to perform operations comprising:
obtaining a plurality of host beacons, each host beacon corresponding to a backhaul and including an endpoint performance data structure, the endpoint performance data structure including metrics of the backhaul in a set of fields, the set of fields including at least two of:
a bandwidth;
a latency;
a number of users using the backhaul;
a cost of the backhaul;
a physical layer characteristic;
a quality of service (QoS); or
application support;
extracting a set of endpoint performance data structures from the plurality of host beacons;
sorting the set of endpoint performance data structures based on sets of fields of members of the set of endpoint performance data structures; and
negotiating entrance to a backhaul for a host corresponding to an endpoint performance data structure at an end of the sorted set of endpoint performance data structures.

16. The at least one machine readable medium of claim 15, wherein negotiating entrance to the backhaul includes:
attaching to the host; and
causing an offer of a resource to be transmitted to the host.

17. The at least one machine readable medium of claim 16, wherein the operations further comprise:
obtaining a rejection to the offer; and
causing a counter offer of the resource to be transmitted to the host in response to the rejection.

18. The at least one machine readable medium of claim 15, wherein negotiating entrance to the backhaul includes exchanging security credentials with the host for a backhaul session.

19. The at least one machine readable medium of claim 18, wherein exchanging the security credentials includes interfacing with an authority via the host.

20. The at least one machine readable medium of claim 15, wherein the physical layer characteristics is at least one of a frequency, a channel width, or a multiple-input-multiple-output (MIMO) configuration.

21. The at least one machine readable medium of claim 15, wherein the type of connection includes at least one of a received signal strength or a protocol.

22. The at least one machine readable medium of claim 15, wherein the application support is an indication of at least one of voice call support, music support, video support, or virtual private network (VPN) support.

23. The at least one machine readable medium of claim 15, wherein the operations further comprise:
   establishing a virtual network tunnel between the device and a destination via the host and backhaul; and
   transmitting data to the destination via the virtual network tunnel.

24. The at least one machine readable medium of claim 15, wherein sorting the set of endpoint performance data structures based on a set of fields of members of the set of endpoint performance data structures includes sorting fields sequentially by a priority mapping, the priority mapping including a ranking of the fields, fields with a higher rank being sorted first.

* * * * *

UNITED STATES PATENT AND TRADEMARK OFFICE
CERTIFICATE OF CORRECTION

PATENT NO. : 10,904,824 B2
APPLICATION NO. : 16/323989
DATED : January 26, 2021
INVENTOR(S) : Robb et al.

Page 1 of 1

It is certified that error appears in the above-identified patent and that said Letters Patent is hereby corrected as shown below:

In the Claims

In Column 22, Line 20, in Claim 13, delete "claim 2," and insert --claim 12,-- therefor In Column 22, Line 23, in Claim 14, delete "claim 2," and insert --claim 12,-- therefor Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*